May 12, 1970
D. D. MATULKA
3,511,551
WIDEBAND OPTICAL MODULATOR
Filed Dec. 6, 1966
2 Sheets-Sheet 1
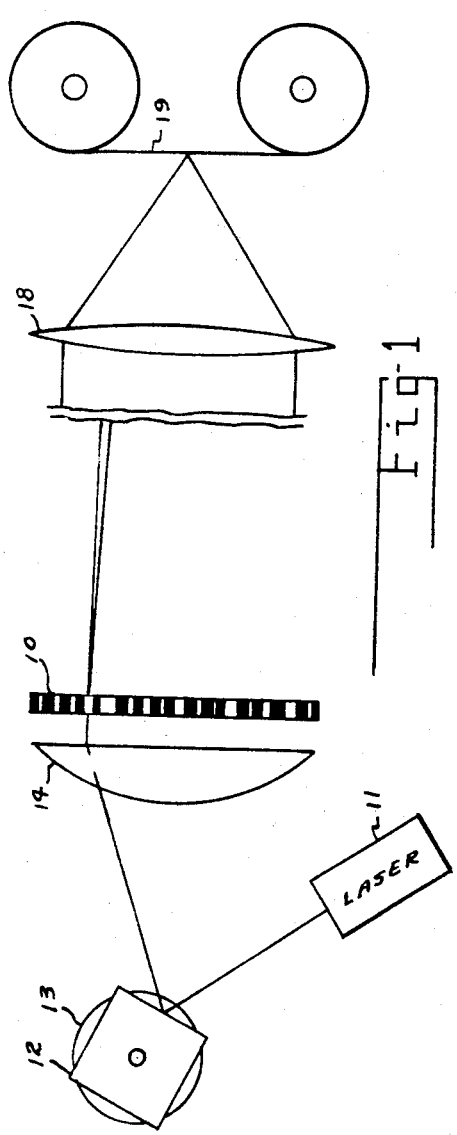
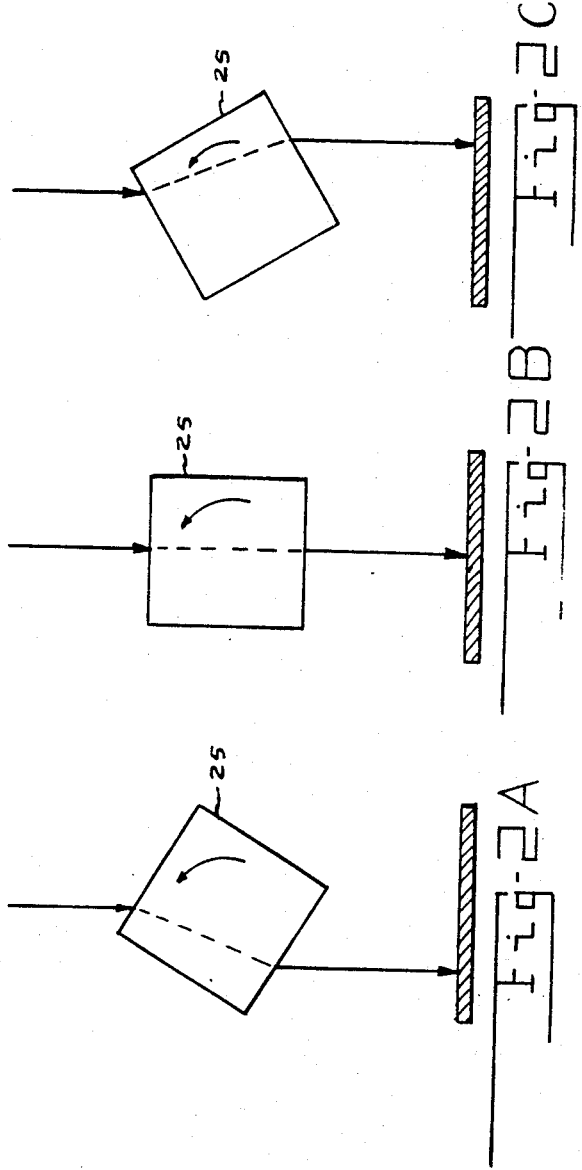
INVENTOR.
DONALD D. MATULKA
BY Harry A. Herbert Jr.
ATTORNEY
Richard J. Killoren
AGENT

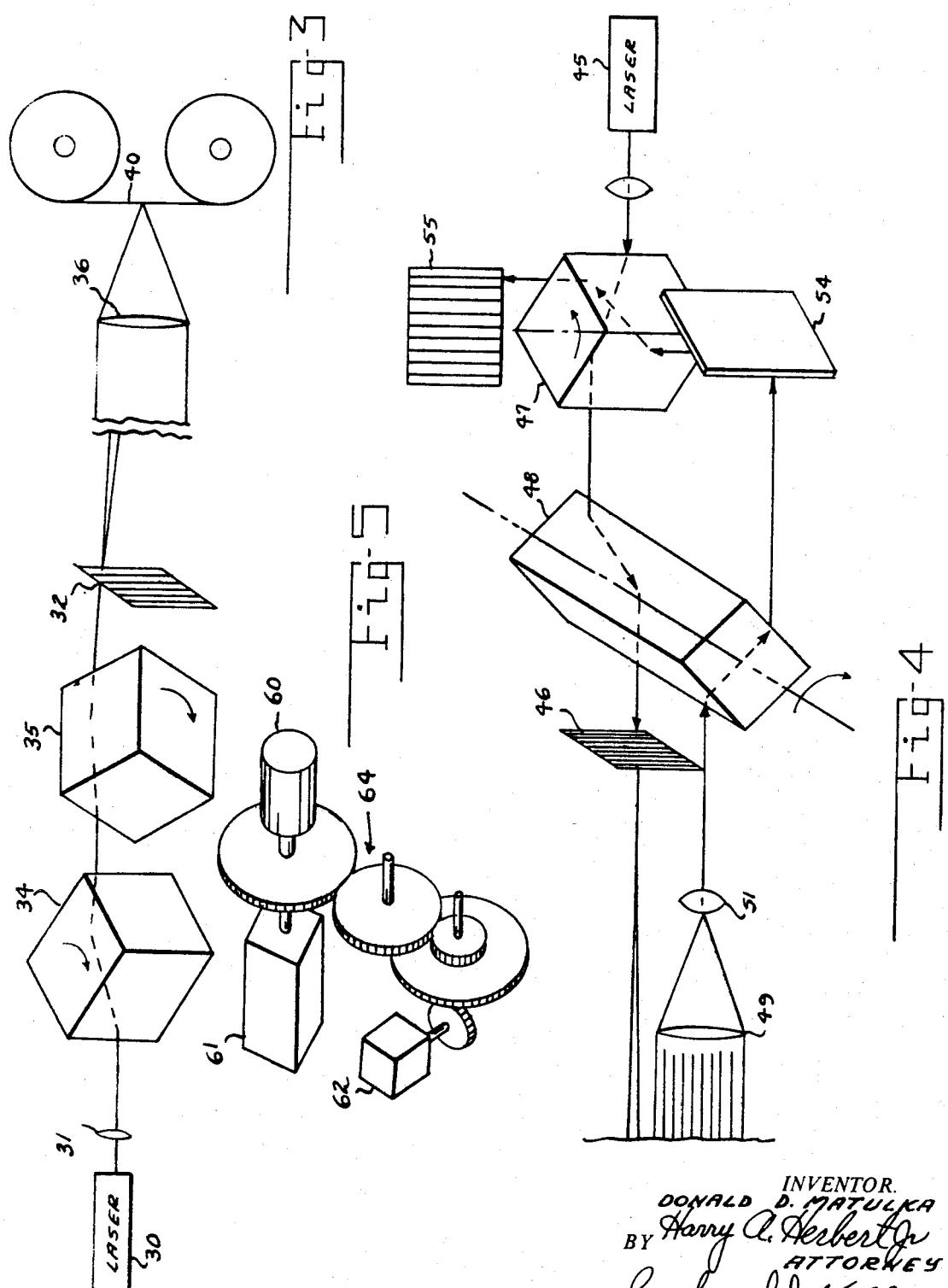

United States Patent Office

3,511,551
Patented May 12, 1970

3,511,551
WIDEBAND OPTICAL MODULATOR
Donald D. Matulka, Fairborn, Ohio, assignor to the United States of America as represented by the Secretary of the Air Force
Filed Dec. 6, 1966, Ser. No. 600,003
Int. Cl. G02b *17/00;* G02f *1/34*
U.S. Cl. 350—7                                                           1 Claim

ABSTRACT OF THE DISCLOSURE

The output of a continuous wave laser is scanned over a transparent or reflective plate containing stored information. The information is stored on the plate in such a manner that it provides phase, polarization or intensity modulation of light passing through or reflected from the plate. As the beam is scanned over the plate, it is modulated in accordance with the stored information. It is necessary however that the light leaving the transmitter be collimated. The light can be collimated after it is scanned across the plate or the light may be collimated before scanning and then scanned across the plate in such a manner that the light leaving the scanner is parallel to the incident beam. After the beam is modulated, it is allowed to propagate to the distant receiver.

---

The invention described herein may be manufactured and used by or for the United States Government for governmental purposes without the payment to me of any royalty thereon.

Prior art

One of the many interesting potential applications of lasers is communication. The collimation properties of the laser provide the possibility of beaming optical energy over interplanetary distances in space, and its very high frequency holds the promise of extremely high information rates. To date, no optical modulator has been developed which shows promise of approaching the theoretically available information rates of $10^{13}$ information elements per second, or an information bandwidth of $10^{13}$ c.p.s. Existing modulators which are used to impress high information rates, or wideband modulation on a laser beam, employ an electro-optic material which is driven by a radio-frequency circuit. These modulators usually employ a polarized light beam that is passed through an electro-optic crystal which is placed in an appropriate electric field. By various arrangements of crystal orientations and polarization filters, the resultant modulation can be polarization modulation, amplitude modulation, phase or frequency modulation. One of the more successful of these techniques consists of placing the electro-optic material into a traveling-wave guide. A modulator of this type displaying gigacycle bandwidth has been fabricated as described by C. J. Peters "Gigacycle Bandwidth Coherent Light Traveling-Wave Phase Modulator," Proceedings of the I.E.E.E., January 1963, pages 147 to 153. Another fairly successful technique employs the electro-optic crystal in a resonant microwave cavity as described by R. H. Blumenthal "Design of a Microwave-Frequency Light Modulator," Proceedings of the IRE, April 1962, pages 452 to 456.

All of these modulators, however, are limited in bandwidth to that attainable in the radio-frequency circuit. They are inherently incapable of approaching theoretical optical bandwidths. It can therefore be concluded that an entirely new approach to the problem of wideband optical modulation is required.

Brief description

According to this invention, a laser beam is scanned over a screen or plate containing stored information so that the stored information modulates the beam directly. The scanning and modulating system of the invention is such that the light leaving the transmitter is collimated light.

One object of the invention is to provide a technique for optically transmitting information from one point to another.

Another object of the invention is to provide a system for modulating a laser beam by scanning the beam over a modulating plate wherein the output is collimated light.

According to this invention, a novel modulator is provided whose information rate is completely independent of bandwidths attainable in radio-frequency circuits, and whose bandwidth can conceptually be made to approach the theoretical limits of approximately $10^{13}$ information elements per second. In the drawing:

FIG. 1 is a schematic illustration of a modulation and transmission system according to one embodiment of the invention;

FIGS. 2A, 2B and 2C are diagrammatic illustrations of a scanning system according to another embodiment of the invention;

FIG. 3 is a schematic illustration of a modulation and transmission system according to the invention using the scanning system of FIG. 2;

FIG. 4 is a schematic illustration of an optical ranging system according to the invention; and FIG. 5 is a perspective view of a drive system that can be used for driving the scanning blocks in the devices of FIGS. 3 and 4.

Reference is now made to FIG. 1 of the drawing which shows a modulating system having a modulating plate 10. A light beam from laser 11 is scanned over the modulating plate 10 by a scanner 12 driven by a motor 13. A collimating lens 14 is provided between the scanner 12 and the modulating plate 10. At the receiver, the light is collected by lens 18 and brought to a focus at the receiver. The receiver could consist of some type of storage device such as a photographic film 19 which is moved past the signal bearing beam from lens 18.

Another system that can be used is shown in FIGS. 2 and 3. This system uses transparent rotating blocks. If the index of refraction of the transparent block is higher than that of air, the light beam will be bent upon rotation of the block 25 in the manner shown in FIG. 2. As can be seen, the beam emerging from the block is parallel to the incident beam so that the light leaving the scanner and modulating elements will be collimated and no additional collimating lenses will be required at the transmitter. As shown in FIG. 3, the light from laser 30 is collimated by lens 31 and directed toward modulating screen 32 through a pair of transparent rotating blocks 34 and 35, which scan the light beam across the modulating screen 32 in the X- and Y-direction, respectively. Because there is some divergence in the laser beam, spatial information in the far field, due to the scanning operation, will be negligible. The time modulation, however, will be retained. A collector lens 36 is provided at the receiver as in FIG. 1, then directed to a storage device 40, such as photographic film.

If the information to be received does not need to be spatially positioned, the requirement for synchronizing does not exist. That is, if all the information contents exist in the serial arrangement of the information elements, there is no need to synchronize the receiver with the modulator.

The requirement for synchronizing the receiver scanner with the modulator scanner exists for the case where it is required of the receiver to spatially position an information element to a particular point corresponding to a point in the modulating medium. This would be true for all cases where it is desired to have the receiver display a picture which is a replica of information stored in the modulator. In this case, the modulating plate would have to contain some synchronizing information.

The device of FIG. 4 shows the invention adapted for use as an optical ranging system. This device has a modulator which is substantially the same as in the device of FIG. 3. In this device, the return beam is scanned over the display screen with the same scanning means used for scanning the beam over the modulating plate. The light from laser source 45 is collimated and scanned over modulating plate 46 by scanning blocks 47 and 48 in the same manner as in FIG. 3. The return beam is collected by lens 49, collimated by lens 51 and then directed through scanning block 48 against mirror 54 and through scanning block 47 to an output screen 55. There will thus be a direct relation between the time the light passes a certain point on the modulation screen 46 and the time position of the same modulation information appearing on output screen 55 to thus provide optical ranging information. Range marks may be provided on the output screen 55.

Though two scanning blocks are shown for this ranging system, only one block is needed for some ranging systems.

One type of drive for the two scanning blocks of FIGS. 3 and 4 is shown in FIG. 5. A motor 60 drives the block 61 directly and drives the block 62 through a gear train 64. Any well-known gear train, that provides the desired rotation ratios and which drives the block 62 at right angle to the direction of rotation of block 61, may be used.

There is thus provided a direct optical, modulation, and transmission system, using a laser beam.

While certain specific embodiments have been described, it is obvious that numerous changes may be made without departing from the general principles and scope of the invention.

I claim:

1. An optical modulation and transmission system, comprising: laser means for producing a continuous wave beam of light along a predetermined path; a modulating plate, in said beam path, having information stored thereon; means, including a light scanning means and a collimating lens, optically aligned with and located between said light producing means and said modulating plate, for scanning collimated light from said light producing means across said modulating plate to thereby provide a transmitted beam of collimated, modulated light; said scanning means being a first cube of transparent material and a second cube of transparent material; means for rotating said first transparent cube at a predetermined speed; means for rotating said second cube at a predetermined speed in a direction at 90 degrees with respect to the direction of rotation of said first cube.

References Cited

UNITED STATES PATENTS

| 3,064,887 | 11/1962 | Waters et al. | |
| 3,324,478 | 6/1967 | Jacobs | 350—162 |
| 2,957,386 | 10/1960 | Robinson | 350—6 X |
| 3,217,623 | 11/1965 | Hotchkiss | 350—7 X |
| 3,343,451 | 9/1967 | Durocher | 350—7 |
| 3,345,912 | 10/1967 | Lohmann | 350—6 |
| 3,350,156 | 10/1967 | Adams | 350—7 |

OTHER REFERENCES

Waddell, "Rotating Prism Design For Continuous Image Compensation Cameras," Applied Optics, July 1966, vol. 5, No. 7, July 1964.

PAUL R. GILLIAM, Primary Examiner

U.S. Cl. X.R.

350—6, 285